United States Patent [19]

Lattime

[11] 4,399,253
[45] Aug. 16, 1983

[54] NOVEL METHOD OF REMOVING RESIDUAL ACRYLONITRILE FROM LATEX SYSTEMS

[75] Inventor: Richard R. Lattime, Tallmadge, Ohio

[73] Assignee: The Goodyear Tire & Rubber Company, Akron, Ohio

[21] Appl. No.: 323,527

[22] Filed: Nov. 23, 1981

[51] Int. Cl.³ .............................................. C08L 55/00
[52] U.S. Cl. .................................... 524/565; 528/491; 526/341
[58] Field of Search ................ 524/565; 528/488, 490, 528/491; 526/341

[56] References Cited
U.S. PATENT DOCUMENTS 3,980,600  9/1976  Coffey ................................. 525/261
4,082,818  4/1978  Coffey et al. ....................... 525/255
4,238,441  10/1980  Cramer ................................. 525/350
4,278,582  7/1981  Miller .......................... 260/29.6 AN
4,287,308  9/1981  Nakayama et al. .................... 521/53

Primary Examiner—John Kight, III
Assistant Examiner—Amelia B. Yarbrough
Attorney, Agent, or Firm—Alvin T. Rockhill

[57] ABSTRACT

Acrylonitrile is a monomer that is widely used in the production of a vast variety of polymers. Undesirable quantities of residual unpolymerized acrylonitrile are often present in polymers. The residual or free acrylonitrile in polymers can be reacted with certain thiols in order to reduce their content in the polymer. In the reaction between these thiols and acrylonitrile products are formed which exhibit antioxidant ability.

32 Claims, No Drawings

NOVEL METHOD OF REMOVING RESIDUAL ACRYLONITRILE FROM LATEX SYSTEMS

BACKGROUND OF THE INVENTION

Acrylonitrile monomer is a basic building block for a number of very important polymers. By polymerizing acrylonitrile polyacrylonitrile may be obtained. It is a white fiber that has a very good resistance to acids, common solvents, oils, greases, salts, and sunlight. Nitrile rubbers which have excellent abrasion, oil and chemical resistance are prepared by the copolymerization of butadiene and acrylonitrile. Acrylonitrile monomer can be utilized in a great many other copolymers and terpolymers.

After the synthesis of a polymer that contains linkages that are derived from acrylonitrile is completed some unpolymerized acrylonitrile monomer will still be present. Polymers that contain acrylonitrile linkages, acrylonitrile polymers, are normally synthesized by emulsion polymerization in an aqueous system. The unpolymerized residual acrylonitrile normally remains in both the acrylonitrile polymer itself and in the water. The normal procedure of stripping by vacuuming or steam does not usually remove all of this undesirable residual acrylonitrile. Since acrylonitrile is believed to be toxic through the cyanide effect it would be highly desirable to remove substantially all free residual acrylonitrile.

Most polymers are susceptible to oxidative and photo-initiated degradation which decrease their service life. This deterioration occurs during fabrication, storage and use. This degradation is commonly caused by heat, ionizing radiation, mechanical stress, or chemical reactions which cause chemical bonds in the polymer to break and the formation of free radicals. A complex sequence of chemical reactions is generally involved in the degradation of a polymer. Either by breaking the polymers chain and/or crosslinking, the polymer's molecular weight is usually changed very substantially. Such a deterioration can render a polymer totally unsuitable for the purpose for which it was intended. For this reason most polymers normally require the addition of an antioxidant in order to minimize the possibility of degradation.

SUMMARY OF THE INVENTION

Residual acrylonitrile dissolved in polymers and/or the emulsifier system and the water phase used in the polymerization of a polymer can be reduced significantly by treatment with at least a stoichiometric amount of a thiol based on the amount of residual acrylonitrile present. Thiols react with residual acrylonitrile by adding to its double bond with the reaction product remaining in the polymer system. Certain types of thiols may be used to react with residual acrylonitrile that produce reaction products that are antioxidants. The amount of residual acrylonitrile monomer in latex systems can be reduced often to nondetectable levels or trace amounts by a reaction with thiols at the same time utilizing the reaction product formed as an antioxidant to protect the polymer from oxidative and thermal degradation.

Any thiol may be used which can react with residual acrylonitrile by adding to its double bond. Thiols that can be used to reduce residual or free acrylonitrile concentrations to low levels and form reaction products that have antioxidant activity contain an ester linkage connected by 1, 2 or 3 carbon atoms to a thiol group. Such thiols are selected from the group consisting of thiol substituted paraffins and thiol substituted aromatic hydrocarbons wherein at least one thiol substituent has the general structural formula:

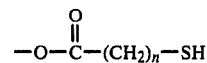

and wherein n is an integer from 1 to 3, inclusive. Monothiols having the general structural formula:

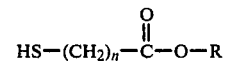

wherein n is an integer from 1 to 3 inclusive, and R is a hydrocarbon chain, can be used to eliminate residual acrylonitrile and on reacting with acrylonitrile produce in situ antioxidants. The following representative examples of thiols that can be used are intended to illustrate but not limit the scope of the present invention. Monothiols can be used when R is a primary alkyl group (paraffin group) as in ethyl thioglycolate, ethyl 3-mercaptopropionate, hexylthioglycolate, octyl 3-mercaptopropionate, eicosyl 3-mercaptopropionate, triacontyl thioglycolate, dodecyl thioglycolate, and dodecyl 3-mercaptopropionate, when R is a secondary alkyl group (paraffin group) as in isobutyl thioglycolate, isobutyl 3-mercaptopropionate, isooctyl 3-mercaptopropionate, and isopropyl thioglycolate, or when R is a tertiary alkyl group (paraffin group) as in t-butyl 3-mercaptopropionate, t-butyl thioglycolate, and t-octyl 3-mercaptopropionate. Aromatic mono-thiols are also useful and some representative examples are:

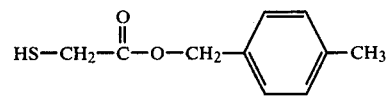

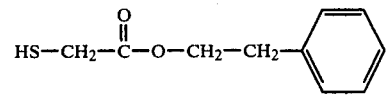

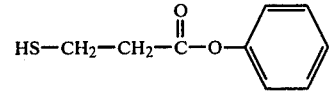

Polythiols have been found to yield good results and they are preferred in the practice of this process. Some representative examples of polythiols are:

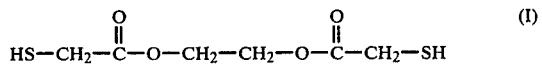 (I)

 (II)

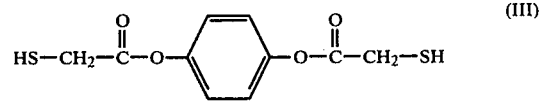 (III)

-continued

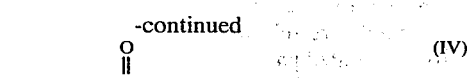
(IV)

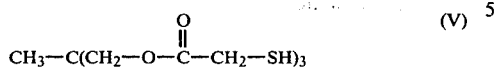
(V)

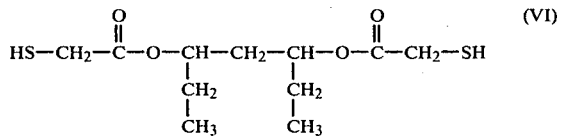
(VI)

Since polythiols have more than one reactive site, they are very effective in reacting with residual acrylonitrile. The amount of thiol needed to remove all residual acrylonitrile must be at least equivalent stoichiometrically to the amount of residual acrylonitrile present. This stoichiometric relationship is based on the amount of residual acrylonitrile present in the system and the number of thiol groups needed to react with that amount of acrylonitrile. For example, if one mole of acrylonitrile was present in a system at least one mole of a mono-thiol or one-half mole of a dithiol would be needed to eliminate all of the free acrylonitrile. Good results have been obtained when twice the stoichiometric amount of certain thiols required to react with the residual acrylonitrile were used. Even larger amounts of thiols may be used to react with residual acrylonitrile, but such amounts do not appear to be advantageous. If it is desirable to remove only part of the residual acrylonitrile, then, of course, less than the stoichiometric amount of thiol can be used.

This process for reacting free acrylonitrile with thiols can be used in an aqueous emulsion of any polymer containing free acrylonitrile. This process is particularly useful in acrylonitrile polymers which are polyacrylonitrile and copolymers formed by the polymerization of acrylonitrile with other vinyl comonomers. For example, this process is very useful of nitrile rubbers which are prepared by the copolymerization of butadiene and acrylonitrile. The monomer ratio between acrylonitrile and butadiene in nitrile rubbers may be varied within a wide range, however, normally no more than 50 percent of the nitrile rubbers chain linkages are derived from acrylonitrile. Other comonomers that may be polymerized with acrylonitrile to form polymers in which this process of removing residual acrylonitrile is useful include styrene, isoprene, alkyl acrylates, such as methyl acrylate, ethyl acrylate, butyl acrylate, methyl methacrylate and the like; vinylidene monomers having one or more terminal $CH_2=C<$ groups; vinyl aromatics such as $\alpha$-methyl styrene, bromo-styrene, chloro-styrene, fluoro-styrene, vinylphenol, 3-hydroxy-4-methoxy-styrene, vinylanisole, $\beta$-nitro-styrene, and the like; $\alpha$-olefins such as ethylene, propylene, and isobutylene; vinyl halides such as bromoethene, chloroethene, fluoroethene, iodoethene, 1,2-dibromoethene, 1,1-dichloroethene, 1,2-dichloroethene, 1,1-difluorethene, tribromoethene, trichloroethene, tetrachloroethene, and the like; aminoethene; vinyl esters such as vinyl acetate; $\alpha,\beta$-olefinically unsaturated nitriles such as methacrylonitrile; $\alpha,\beta$-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; $\alpha,\beta$-olefinically unsaturated N-alkylol amides having the general structural formula:

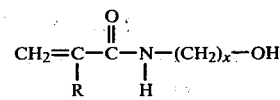

wherein R is a hydrogen atom or an alkyl group containing from 1 to 4 carbon atoms and x is an integer from 1 to 4 inclusive such as N-methylol acrylamide, N-ethylol acrylamide, N-propylol acrylamide, N-methylol methacrylamide, N-ethylol methacrylamide, and the like; vinyl ketones such as 4-penten-2-one, 3-buten-2-one, and the like; vinyl pyridine; alkyl vinyl ethers such as methyl vinyl ether, isopropyl vinyl ether, n-butyl vinyl ether, and the like; haloalkyl vinyl ethers such as 2-chloroethyl vinyl ether, n-octyl methacrylate, dodecyl methacrylate, methyl ethacrylate, and ethyl ethacrylate; haloalkyl acrylates such as chloropropyl acrylate; amino-acrylates; methacrylates; hydroxyethylacrylate; polyfunctional compounds such as ethylene glycol dimethacrylate, diethylene glycol diacrylate, divinyl benzene, alkyl pentaerythritol, methylene-bisacrylamide, and the like; $\alpha$-$\beta$-olefinically unsaturated carboxylic acids containing from 3 to 10 carbon atoms such as methacrylic acid, crotonic acid, $\beta$-acryloxy propionic acid, sorbic acid, hydrosorbic acid, $\alpha$-chlorosorbic acid, cinnamic acid, $\beta$-styrlacrylic acid, itaconic acid, citraconic acid, maleic acid, fumaric acid, mesaconic acid, aconitic acid, and glutaconic acid.

In the polymerization of acrylonitrile monomer with one or more of the above-mentioned monomers there can be competing or side reactions which take place. Therefore, the choice of reactants, process conditions, order of addition of the reactants and the like should be selected in order to produce a useful polymer containing acrylonitrile linkages. In general, the resulting copolymer, terpolymer or multimonomer polymer should contain at least about 5 percent by weight of acrylonitrile moieties. If the polymer is a copolymer with acrylonitrile, the acrylonitrile moiety may be as high as about 95 percent by weight of the resulting copolymer. For the polymerization of acrylonitrile to polyacrylonitrile, the resulting polymer is substantially all acrylonitrile moieties. The polymers which are preferred are polyacrylonitrile, butadiene-acrylonitrile copolymers, styrene-butadiene-acrylonitrile terpolymers and terpolymers of acrylonitrile, butadiene and methacrylic acid.

The polymers for which this process is useful may be synthesized using any conventional polymerization technique. The emulsifier used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization. Normally, such an emulsion polymerization is run in a temperature range from about 0° C. to about 100° C., with good results being obtained when the reaction is run from about 45° to 60° C. for many common polymers. The polymerization of these acrylonitrile containing polymers may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like.

The water soluble peroxygen free radical initiators are especially useful in aqueous emulsion polymerization. It may be desirable to add post-polymerization emulsifiers and stabilizers, which will not interfer with this process for removing residual acrylonitrile.

While many thiols are effective in reacting with residual acrylonitrile in aqueous emulsions containing free acrylonitrile those that produce reaction products which are in situ antioxidants are most useful. These types of aforementioned thiols can be added to the free acrylonitrile containing aqueous emulsion at any point after the polymerization of the polymer has been completed. Normally this thiol will be added immediately after the polymerization is completed and prior to the separation of the emulsion to maximize the reaction time between the free acrylonitrile and the thiols.

In practice, it is contemplated that the molar equivalent of thiol moiety used will be 1.5 to 2.5 times the number of moles of free acrylonitrile present in the emulsion. If the time period in which the thiol has to react with the acrylonitrile is short, it will be desirable to use even greater amounts of the thiol. It is permissible and sometimes preferable to steam and/or vacuum strip the polymer emulsion to remove as much free acrylonitrile as possible and then to use a thiol to react with the remainder of the free acrylonitrile which is difficult or impossible to remove completely by stripping techniques. By utilizing this combination of methods for reducing the free acrylonitrile content of an emulsion, less thiol need be used. Normally, this would be the preferred procedure, however, when a great deal of antioxidant protection is desired substantially all of the free acrylonitrile may be reacted with thiols which will function as antioxidants to protect the polymer.

This process is of tremendous value when antioxidant protection is desired for the polymer being treated. It can also be applied in the treatment of effluent streams wherein undesirable amounts of acrylonitrile are dissolved even though antioxidant protection is not required. By treating aqueous effluents from manufacturing plants that utilize acrylonitrile monomer with those thiols the undesirable free acrylonitrile would be minimized. A further application of this process would be the use of thiols as gas scrubbers where gaseous effluents from reactors and the like contain undesirable acrylonitrile that is vented to the atmosphere.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLE 1

In order to demonstrate the effectiveness of thiols in reacting with free acrylonitrile in latex systems, glycol dimercaptoacetate was added to a copolymer of acrylonitrile and butadiene which contained residual acrylonitrile monomer. The charge composition used in the synthesis of this nitrile rubber latex was 146.0 parts water, 9.2 parts rosin acid (soap), 0.11 parts sodium sulfate, 45.0 parts acrylonitrile, 55.0 parts butadiene, and 0.1 parts $K_2S_2O_8$. Of the rosin acids about 90 percent are isometric with abietic acid and the other 10 percent is a mixture of dihydroabietic acid and dehydroabietic acid. This latex had a concentration of residual acrylonitrile of about 7000 ppm (parts per million) before treatment. The glycol dimercaptoacetate was added directly to quart polymerization bottles containing the latex. These bottles were subsequently placed in a constant temperature bath at 52° C. and tumbled for a period of 4 hours. Analytical determinations for residual acrylonitrile content were then made on the various samples by using flame ionization gas chromatography. An Aerograph Hy Fi, Model 550, gas chromatograph was used in conjunction with a Bendix electrometer detector for these analytical determinations. The following results demonstrate the effectiveness of this process for removing residual acrylonitrile from a polymer emulsion. Table I shows that as the molar equivalent ratio of thiol moiety to free acrylonitrile is increased by adding larger quantities of this polythiol there is a corresponding reduction in the amount of residual acrylonitrile present.

TABLE I

| Molar Equivalent Ratio (thiol moiety/residual acrylonitrile) | % Reduction of Residual Acrylonitrile |
| --- | --- |
| .27 | 22 |
| .55 | 52 |
| .82 | 75 |
| .975 | 99.7 |

As can be determined from this example glycol dimercaptoacetate is very efficient in reacting with free acrylonitrile in this process. There was a very dramatic reduction in the concentration of free acrylonitrile in this latex with the reduction being proportional to the molar equivalent ratio of glycol dimercaptoacetate added. This polythiol is almost 100 percent effective in reacting with residual acrylonitrile.

Different thiols can lower residual acrylonitrile content by approximately the same amount when equal molar equivalent ratios are used. When the procedure as described in Example 1 is employed using one mole of

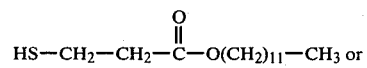

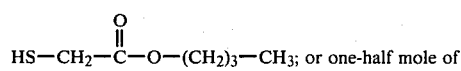

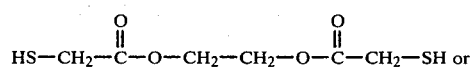

-continued

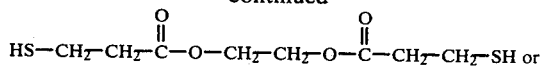

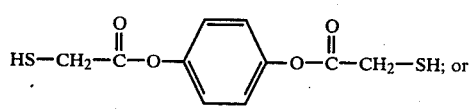

one-third mole of 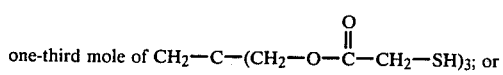

one-fourth mole of 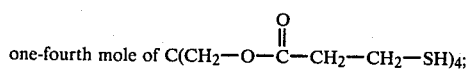

will react with one mole of residual acrylonitrile. Since all thiols can lower the residual acrylonitrile content by the same approximate amount at the same molar equivalent ratio, it is often advantageous to use polythiols as compared to monothiols because the actual weight of the thiol that needs to be added can be significantly reduced. The actual weight of glycol dimercaptopropionate needed to tie up one mole of residual acrylonitrile is less than one-half of the amount of dodecyl-3-mercaptopropionate needed.

EXAMPLE 2

Five different thiols were stirred into the acrylonitrile butadiene copolymer latex as specified in Example 1 using an electric motor driven agitator at moderate speed in open beakers at room temperature for a period of five minutes. The molar equivalent ratio of thiol moiety added was about 1.12 in relation to the residual acrylonitrile originally present. Again the samples were tested for residual acrylonitrile content by flame ionization gas chromatography. The resulting reduction in free acrylonitrile content is given in Table II below.

TABLE II

| Thiol Used | Number of thiol substituent groups | Reduction in Free Acrylonitrile |
|---|---|---|
| Dodecyl Thioglycolate | 1 | 95% |
| Dodecyl 3-mercaptopropionate | 1 | 96% |
| Glycol Dimercaptopropionate | 2 | 97% |
| Trimethylolethane Trithioglycolate | 3 | 71% |
| Glycol Dimercaptoacetate | 2 | 80% |

All of these thiols are very effective in reducing the concentration of free acrylonitrile in latex. Table II illustrates the fact that more than one thiol substituent group in a compound can be utilized to efficiently react with residual acrylonitrile. Trimethylolethane trithioglycolate which has three thiol substituent groups reduced the concentration of free acrylonitrile by approximately the amount as dodecyl thioglycolate which has only one thiol substituent on a molar equivalent ratio basis.

EXAMPLE 3

Glycol dimercaptoacetate was shown to be very effective in reducing the free acrylonitrile concentration in a terpolymer of butadiene, acrylonitrile and hydroxyethylacrylate. The charge composition used in the synthesis of this terpolymer was 135 parts water, 3.4 parts linear alkylaryl sulfinate potassium salt, 0.37 parts trisodium phosphate, 0.1 parts $K_2S_2O_8$, 61 parts butadiene, 36 parts acrylonitrile, and 3 parts hydroxy ethylacrylate. The initial residual acrylonitrile concentration of this latex was about 780 ppm. Glycol dimercaptoacetate was added to the terpolymer latex in a glass reactor and allowed to react for a period of one hour. A molar equivalent ratio between the thiol and free acrylonitrile of about 3.7 was used. Two samples were run; one at room temperature and the other at 60° C. In both cases no residual acrylonitrile could be detected using flame ionization gas chromatography.

EXAMPLE 4

Using the process as described in Example 3 and a nitrile rubber latex as specified in Example 1 except with a monomer charge composition of 67 percent butadiene and 33 percent acrylonitrile and an initial free acrylonitrile concentration of 2040 ppm, the following results, which are given in Table III, were obtained.

TABLE III

| Thiol Used | Reduction in Free Acrylonitrile |
|---|---|
| Glycol Dimercaptoacetate | 100% |
| Pentaerythritol Tetra-(3-mercaptopropionate) | 99% |
| Trimethylolethane Tri-thioglycolate | 99% |

The molar equivalent ratio between thiol moiety and residual acrylonitrile present in the emulsion was approximately 2. This indicates that a molar equivalent ratio of 2:1 allows polythiols with 2,3, or 4 thiol groups to lower the residual acrylonitrile level of a polymer emulsion dramatically.

EXAMPLE 5

The ability of thiols to reduce the residual acrylonitrile content of a polymer emulsion having a charge composition of 118 parts water, 4 parts sodium dodecyldiphenyl ether disulfonate, 0.9 parts trisodium phosphate, 0.05 parts $K_2S_2O_8$, 71 parts butadiene, 17 parts acrylonitrile, 9.5 parts styrene and 2.5 parts itaconic acid was demonstrated by adding a molar equivalent ratio of about 3.3 to 1 of glycol dimercaptoacetate or glycol dimercaptopropionate. Both of these thiols reduced free acrylonitrile concentrations below detectable levels of analytical determination by flame ionization gas chromatography when the procedure described in Example 3 was used. The original concentration of residual acrylonitrile was about 325 ppm in this latex. This demonstrates that this procedure for removing residual acrylonitrile from latex systems is applicable to complex polymers containing monomer linkages derived from numerous different types of monomers.

EXAMPLE 6

The reaction product formed in the reaction between glycol dimercaptopropionate and residual acrylonitrile monomer provides antioxidant protection for a copolymer of acrylonitrile and butadiene. Approximately one molar equivalent of glycol dimercaptopropionate was added to a copolymer latex using the procedure as discussed in Example 1. This polymer latex, which was also used in Example 1, had a concentration of free acrylonitrile of about 7000 ppm before treatment and a monomer charge composition of 45 percent acrylonitrile and 55 percent butadiene. After the thiol was added to the emulsion the latex was processed using conventional techniques into a copolymer film. Differential thermal analysis was performed on a sample weighing about 22 milligrams. This was done in an air environment and the temperature of polymer degradation was determined to be the temperature where an upward deflection from the base line occurred on the thermogram. It is believed that at this temperature the polymer is starting to undergo the first stages of thermal degradation. A control which was not treated with glycol dimercaptopropionate was also run. The degradation temperature of the control was determined to be 125° C. and the degradation temperature of the copolymer treated with glycol dimercaptopropionate was determined to be 135° C. As can be seen, the reaction product formed provides antioxidant protection for the copolymer, as is exemplified by the 10° C. increase in degradation temperature.

While certain representative embodiments and details have been shown for the purpose of illustrating the invention, it will be apparent to those skilled in this art that various changes and modifications may be made therein without departing from the scope of the invention.

What is claimed is:

1. An improved process for preparing an acrylonitrile polymer latex containing an in situ antioxidant and for reducing the concentration of free acrylonitrile in an acrylonitrile polymer emulsion containing free acrylonitrile, comprising adding to said acrylonitrile polymer emulsion a thiol selected from the group consisting of thiol substituted paraffins and thiol substituted aromatic hydrocarbons wherein at least one thiol substituent has the general structural formula:

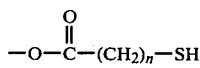

and wherein n is an integer from 1 to 3, inclusive, in amounts and under conditions sufficient to react with said free acrylonitrile.

2. An improved process as specified in claim 1 wherein the thiol is a thiol substituted paraffin.

3. An improved process as specified in claim 2 wherein the thiol substituted paraffin contains from 3 to 30 carbon atoms.

4. The improved process as specified in claim 3 wherein the thiol has a general structural formula:

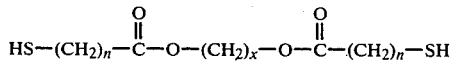

wherein n is an integer from 1 to 3, inclusive, and x is an integer from 1 to 6, inclusive.

5. The improved process as specified in claim 4 wherein the thiol is selected from the group consisting of glycol dimercaptoacetate and glycol dimercaptopropionate.

6. The improved process as specified in claim 3 wherein the thiol has a general structural formula:

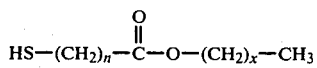

wherein n is an integer from 1 to 3, inclusive and x is an integer from 1 to 24, inclusive.

7. The improved process as specified in claim 6 wherein the thiol is selected from the group consisting of dodecyl 3-mercaptopropionate and dodecyl thioglycolate.

8. The improved process as specified in claim 3 wherein the thiol is selected from the group consisting of trimethylolethane trithioglycolate and pentaerythritol tetra-(3-mercaptopropionate).

9. The improved process as specified in claim 1 wherein at least a stoichiometric amount of said thiol is added to react with said free acrylonitrile.

10. The improved process as specified in claim 1 wherein said thiol is added to said acrylonitrile polymer emulsion at any time after the polymerization of said acrylonitrile polymer has been completed.

11. The improved process as specified in claim 10 wherein said thiol is added to said acrylonitrile polymer emulsion immediately after the polymerization of said acrylonitrile polymer has been completed.

12. The improved process as specified in claim 1 wherein said acrylonitrile polymer is a copolymer of butadiene and acrylonitrile.

13. The improved process as specified in claim 12 wherein said copolymer of butadiene and acrylonitrile has up to 50 percent of its chain linkages being derived from acrylonitrile.

14. The improved process as specified in claim 1 wherein said acrylonitrile polymer is a terpolymer of butadiene, styrene, and acrylonitrile.

15. The improved process as specified in claim 1 wherein said acrylonitrile polymer is a terpolymer of butadiene, methacrylic acid, and acrylonitrile.

16. The improved process as specified in claim 1 wherein said acrylonitrile polymer is selected from the group consisting of polyacrylonitrile; copolymers of ethylacrylate and acrylonitrile; copolymers of styrene and acrylonitrile; copolymers of isoprene and acrylonitrile; terpolymers of butadiene, acrylonitrile and acrylic acid; terpolymers of butadiene, acrylonitrile, and hydroxyethylacrylate; and copolymers of butadiene, acrylonitrile, styrene, and itaconic acid.

17. An improved acrylonitrile polymer latex containing an in situ antioxidant produced by the process comprising, adding to an acrylonitrile polymer emulsion containing free acrylonitrile a thiol selected from the group consisting of thiol substituted paraffins and thiol substituted aromatic hydrocarbons wherein at least one thiol substituent has the general structural formula:

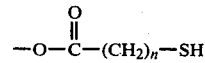

and wherein n is an integer from 1 to 3, inclusive, in amounts and under conditions sufficient to react with said free acrylonitrile.

18. An improved acrylonitrile polymer latex as specified in claim 17 wherein the thiol is a thiol substituted paraffin.

19. An improved acrylonitrile polymer latex as specified in claim 18 wherein the thiol substituted paraffin contains from 3 to 30 carbon atoms.

20. The improved acrylonitrile polymer latex as specified in claim 19 wherein the thiol has a general structural formula:

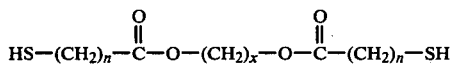

wherein n is an integer from 1 to 3, inclusive, and x is an integer from 1 to 6, inclusive.

21. The improved acrylonitrile polymer latex as specified in claim 20 wherein the thiol is selected from the group consisting of glycol dimercaptoacetate and glycol dimercaptopropionate.

22. The improved acrylonitrile polymer latex as specified in claim 19 wherein the thiol has a general structural formula:

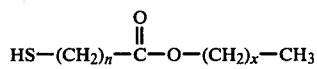

wherein n is an integer from 1 to 3, inclusive and x is an integer from 1 to 24, inclusive.

23. The improved acrylonitrile polymer latex as specified in claim 22 wherein the thiol is selected from the group consisting of dodecyl 3-mercaptopropionate and dodecyl thioglycolate.

24. The improved acrylonitrile polymer latex as specified in claim 19 wherein the thiol is selected from the group consisting of trimethylolethane trithioglycolate and pentaerythritol tetra-(3-mercaptopropionate).

25. The improved acrylonitrile polymer latex as specified in claim 17 wherein at least a stoichiometric amount of said thiol is added to react with said free acrylonitrile.

26. The improved acrylonitrile polymer latex as specified in claim 17 wherein said thiol is added to said acrylonitrile polymer emulsion at any time after the polymerization of said acrylonitrile polymer has been completed.

27. The improved acrylonitrile polymer latex as specified in claim 26 wherein said thiol is added to said acrylonitrile polymer emulsion immediately after the polymerization of said acrylonitrile polymer has been completed.

28. The improved acrylonitrile polymer latex as specified in claim 17 wherein said acrylonitrile polymer is a copolymer of butadiene and acrylonitrile.

29. The improved acrylonitrile polymer latex as specified in claim 28 wherein said copolymer of butadiene and acrylonitrile has up to 50 percent of its chain linkages being derived from acrylonitrile.

30. The improved acrylonitrile polymer latex as specified in claim 17 wherein said acrylonitrile polymer is a terpolymer of butadiene, styrene and acrylonitrile.

31. The improved acrylonitrile polymer latex as specified in claim 17 wherein said acrylonitrile polymer is a terpolymer of butadiene, methacrylic acid, and acrylonitrile.

32. The improved acrylonitrile polymer latex as specified in claim 17 wherein said acrylonitrile polymer is selected from the group consisting of polyacrylonitrile; copolymers of ethylacrylate and acrylonitrile; copolymers of styrene and acrylonitrile; copolymers of isoprene and acrylonitrile; terpolymers of butadiene, acrylonitrile and acrylic acid; terpolymers of butadiene, acrylonitrile, and hydroxyethylacrylate; and copolymers of butadiene, acrylonitrile, styrene, and itaconic acid.

* * * * *